US009495471B2

(12) United States Patent
Bank et al.

(10) Patent No.: US 9,495,471 B2
(45) Date of Patent: Nov. 15, 2016

(54) OPTIMIZE VIEW ELEMENTS SIZES TO MAXIMIZE MOST DATA VIEWED IN A MULTIPLE VIEW ELEMENTS GUI

(75) Inventors: Judith Helen Bank, Morrisville, NC (US); Lisa Marie Wood Bradley, Cary, NC (US); Lin Sun, Morrisville, NC (US); Chunhui Yang, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 2023 days.

(21) Appl. No.: 12/328,002

(22) Filed: Dec. 4, 2008

(65) Prior Publication Data

US 2010/0146378 A1 Jun. 10, 2010

(51) Int. Cl.
*G06F 17/00* (2006.01)
*G06F 17/30* (2006.01)
*G06F 3/0481* (2013.01)

(52) U.S. Cl.
CPC ......... *G06F 17/3089* (2013.01); *G06F 3/0481* (2013.01); *G06F 17/30873* (2013.01); *G06F 17/30905* (2013.01)

(58) Field of Classification Search
CPC .................. G06F 17/30873; G06F 3/0481
USPC ............... 715/246, 243, 204, 742; 707/E17; 717/6
See application file for complete search history.

(56) References Cited

U.S. PATENT DOCUMENTS

| 5,341,466 | A | * | 8/1994 | Perlin .................. G06T 3/0025 345/428 |
| 5,784,057 | A | * | 7/1998 | Alimpich et al. ............ 715/781 |
| 7,257,777 | B1 | | 8/2007 | Kanevsky et al. |
| 7,281,202 | B2 | * | 10/2007 | Croney ............... G06F 17/3089 707/E17.116 |
| 7,325,197 | B1 | * | 1/2008 | Massena et al. .............. 715/251 |
| 7,376,905 | B2 | * | 5/2008 | Walker .................. G06F 3/0481 345/622 |
| 7,412,644 | B2 | * | 8/2008 | Kieffer .................. G06F 17/211 707/999.1 |
| 7,472,342 | B2 | * | 12/2008 | Haut ................. G06F 17/30581 707/E17.111 |
| 7,475,354 | B2 | * | 1/2009 | Guido et al. .................. 715/742 |

(Continued)

FOREIGN PATENT DOCUMENTS

TW 200643798 12/2006

OTHER PUBLICATIONS

Yu, et al., "Mixup: A Development and Runtime Environment for Integration at the Presentation Layer," Web Engineering, vol. 4607, Jul. 2007, pp. 479-484.

(Continued)

*Primary Examiner* — William Bashore
*Assistant Examiner* — Nathan Shrewsbury
(74) *Attorney, Agent, or Firm* — Steven M. Greenberg, Esq.; CRGO Law

(57) ABSTRACT

Embodiments of the invention provide a computer implemented method, apparatus and computer readable storage medium to automatically resize view elements in a graphical user interface. The method includes monitoring the graphical user interface. The method also includes responsive to a triggering event, invoking a view optimization program. The method further includes responsive to an invocation of the view optimization program, invoking a window preference program for checking window preferences, a portlet preference program for checking portlet preferences for each portlet, and a portlet priority program for checking portlet priority settings. The method additionally includes invoking an apply program for resizing view elements in the graphical user interface based on the window preferences, the portlet preferences, and the portlet priority settings.

12 Claims, 8 Drawing Sheets

(56) References Cited

U.S. PATENT DOCUMENTS

| | | | |
|---|---|---|---|
| 7,487,443 B2 * | 2/2009 | Guido | G06F 17/30873 715/243 |
| 7,493,564 B2 * | 2/2009 | Swanson | G06F 17/30873 715/738 |
| 7,577,672 B2 * | 8/2009 | Guertler | G06F 17/3089 |
| 7,636,881 B2 * | 12/2009 | Lection | G06F 17/3089 715/205 |
| 7,765,143 B1 * | 7/2010 | West | 705/37 |
| 7,805,672 B2 * | 9/2010 | Kobashi | G06F 17/212 715/243 |
| 7,810,036 B2 * | 10/2010 | Bales | G06F 17/30873 709/201 |
| 7,827,494 B1 * | 11/2010 | Hedayatpour | G06F 8/38 709/203 |
| 7,831,905 B1 * | 11/2010 | Jennings | G06F 17/227 707/705 |
| 7,853,883 B2 * | 12/2010 | Guido et al. | 715/742 |
| 7,895,522 B2 * | 2/2011 | Wong | H04L 67/36 715/243 |
| 8,869,027 B2 * | 10/2014 | Louch et al. | G06F 3/0481 715/700 |
| 9,032,296 B1 * | 5/2015 | Jeffs et al. | H04N 21/2187 715/719 |
| 9,104,294 B2 * | 8/2015 | Forstall et al. | G06F 3/0481 |
| 2004/0070620 A1 | 4/2004 | Fujisawa | |
| 2004/0143795 A1 | 7/2004 | Matsuishi | |
| 2005/0060498 A1 * | 3/2005 | Curtis | 711/134 |
| 2005/0108655 A1 | 5/2005 | Andrea et al. | |
| 2005/0246632 A1 * | 11/2005 | Guido et al. | 715/517 |
| 2005/0256940 A1 * | 11/2005 | Henderson et al. | 709/219 |
| 2005/0283524 A1 * | 12/2005 | Kim | 709/217 |
| 2006/0010390 A1 * | 1/2006 | Guido et al. | 715/742 |
| 2006/0015846 A1 * | 1/2006 | Fraleigh et al. | 717/109 |
| 2006/0026557 A1 | 2/2006 | Petri | |
| 2006/0041846 A1 * | 2/2006 | Masselle | G06F 3/0481 715/793 |
| 2006/0047728 A1 * | 3/2006 | Kim et al. | G06F 17/30899 |
| 2006/0080612 A1 | 4/2006 | Hayes et al. | |
| 2006/0212803 A1 * | 9/2006 | Arokiaswamy | 715/520 |
| 2006/0277481 A1 * | 12/2006 | Forstall et al. | 715/764 |
| 2007/0168930 A1 | 7/2007 | Mirkazemi et al. | |
| 2007/0198921 A1 * | 8/2007 | Collison et al. | 715/517 |
| 2008/0052617 A1 * | 2/2008 | Guido et al. | 715/246 |
| 2008/0092039 A1 * | 4/2008 | Brockway et al. | 715/246 |
| 2009/0070713 A1 * | 3/2009 | Whitman | G06F 3/0481 715/854 |
| 2010/0115396 A1 * | 5/2010 | Byron et al. | 715/234 |

OTHER PUBLICATIONS

Bernal, et al., "Portals and Portlets: The Basics," IBM Websphere Portal Extensions, May 2007, pp. 5-23.

* cited by examiner

OPTIMIZE VIEW ELEMENTS SIZES TO MAXIMIZE MOST DATA VIEWED IN A MULTIPLE VIEW ELEMENTS GUI

BACKGROUND OF THE INVENTION

1. Field of the Invention

The invention relates generally to presentation of documents and interactive computer generated content in data processing and more specifically to sizing modification of multiple view elements on a web page.

2. Description of the Related Art

A Web portal, also known as a public portal, is a Web page that provides resources and services in a graphical user interface. Wikipedia defines Web Portal as follows:

> A web portal is a site that provides a single function via a web page or site. Web portals often function as a point of access to information on the World Wide Web. Portals present information from diverse sources in a unified way. Apart from the search engine standard, web portals offer other services such as e-mail, news, stock prices, infotainment, and other features. Portals provide a way for enterprises to provide a consistent look and feel with access control and procedures for multiple applications, which otherwise would have been different entities altogether.

Users of web portals include e-mail services, search engines and online shopping services. In order to provide resources and services, specialized content areas occupy windows within the Web portal. These specialized content areas are called portlets. A user can edit, maximize, minimize or float the portlet within the Web portal.

In addition to portlets, windows or frames may also be displayed on the graphical user interface. As used herein, the term view element shall mean a portlet, a frame or a window in a Web page or a graphical user interface. Many software applications deal with multiple view elements in a single screen view such as Portal, Eclipse, Integrated Solution Console (ISC), Tivoli Enterprise Portal (TEP), and other applications.

When multiple view elements are combined in a single screen view, the content of each view element is dynamically retrieved. Some view elements have a lot of content, and some do not. Therefore, a user may need to enlarge the user's browser window in order to have a clear display of all view elements. Continuous manual adjustment of the browser window size is undesirable at least because it can reduce productivity on the part of the user.

Moreover, when multiple view elements within a Web portal display dynamically retrieve data, the multiple view elements may be improperly sized for the user to be able to read the dynamically retrieved data. For example, a view element that had very little data and that had a small size may retrieve a large amount of data that requires the view element to have a large size in order to be properly viewed.

Dynamic Drive's "Iframe SSI script II" dynamically resizes an IFRAME to the height of the page contained within the IFRAME in order to eliminate IFRAME scrollbars from appearing while showing the entire external content. ORACLE's Studio determines the placement of the portlet on the page with a higher priority portlet displaying closer to the left side of the page. Moreover, it is known to resize frames and even to allow frames and images to overlap in order to better utilize space on a web page.

However, a need exists for a way to resize multiple portals and the data content in the multiple portals in order to give a user the best access to the data on the web page. What is needed beyond the prior art is a way to properly size portal view elements for viewer use.

BRIEF SUMMARY OF THE INVENTION

A View Element Adjuster (VEA) comprises a web page rewrite program and a view element optimization program. The rewrite program monitors a web page having a plurality of view elements and resizes one or more of the plurality of view elements in accordance with a set of user configured preferences, a plurality of priorities for each of the plurality of view elements, and the data dynamically retrieved for each of the plurality of portlets. VEA also has a window preference program, a portlet preference program, and a portlet priority program. VEA accesses a number of files including a window preference file, a portlet preference file, a portlet priority file, a portlet data file, a preferences conflict rules file, and a priority conflict rules file.

DETAILED DESCRIPTION OF THE INVENTION

Figure 1:
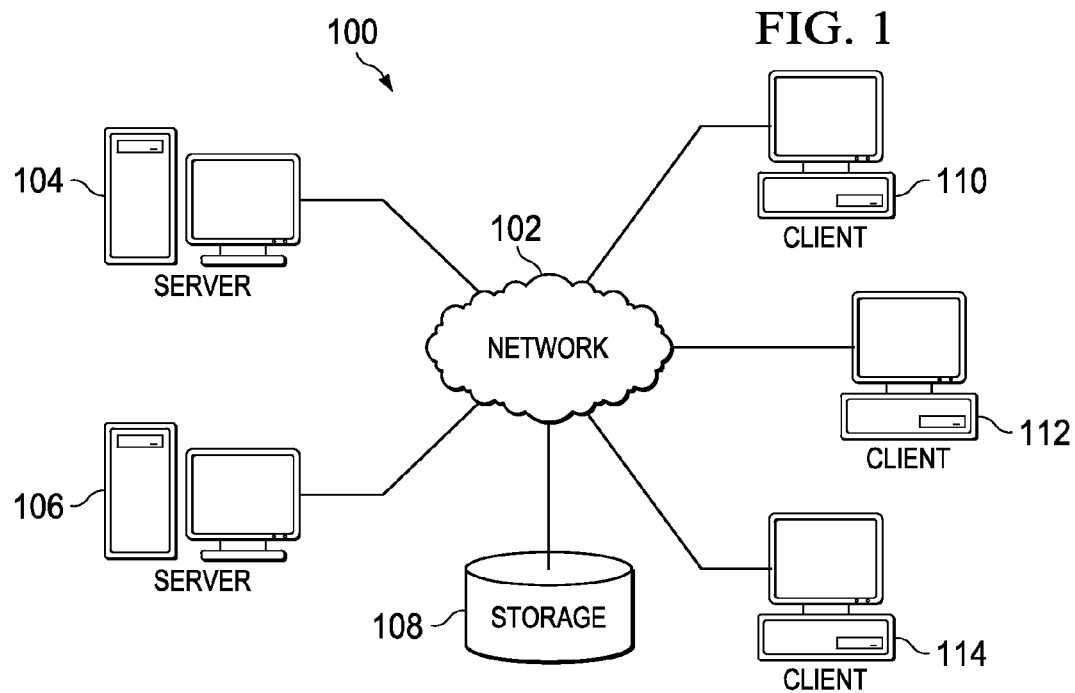
FIG. 1 depicts an exemplary server-client computer system.

As will be appreciated by one skilled in the art, the View Element Adjuster may be embodied as a system, method or computer program product. Accordingly, the View Element Adjuster may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the View Element Adjuster may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the View Element Adjuster may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The View Element Adjuster (VEA) is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
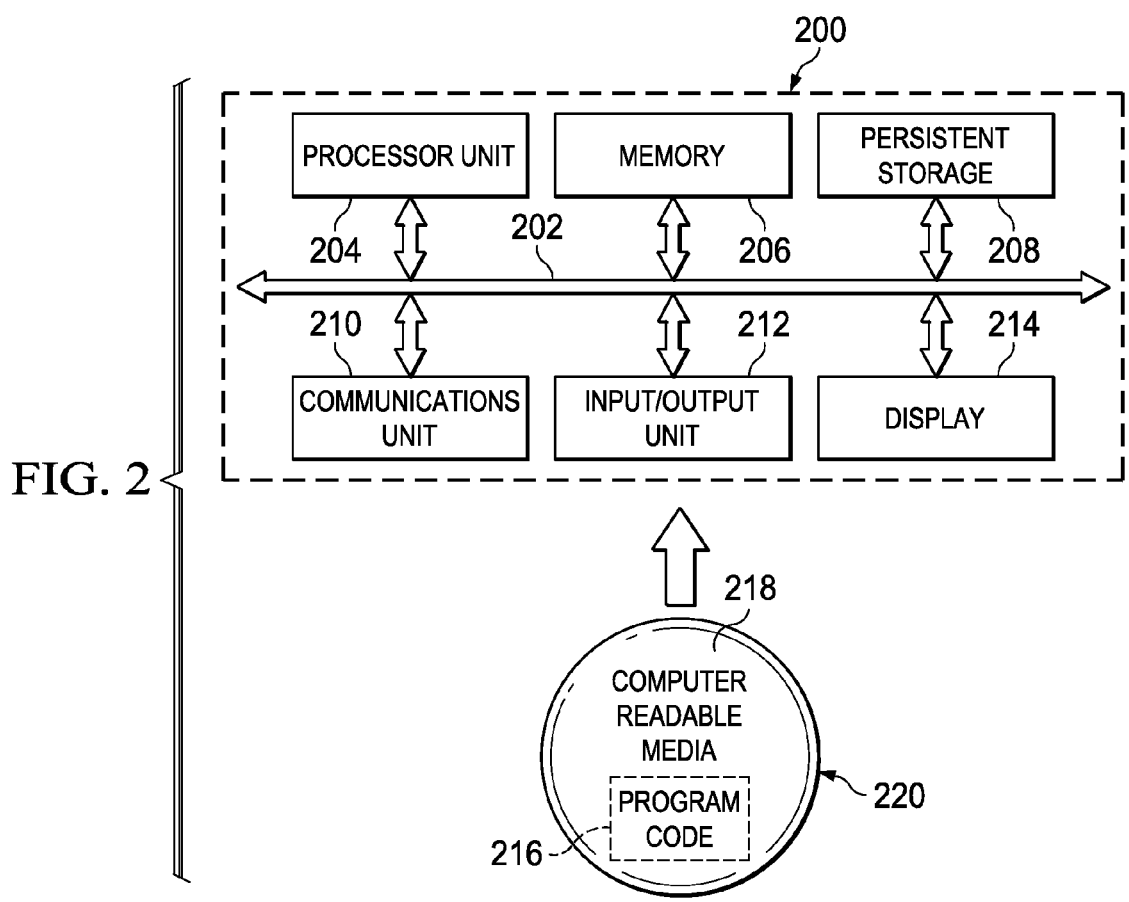
FIG. 2 depicts an exemplary computer framework.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. Computer readable media 218 also may take the form of non-tangible media, such as communications links or wireless transmissions containing program code 2116.

In some illustrative embodiments, program code 216 may be downloaded over a network to persistent storage 208 from another device or data processing system for use within data processing system 200. For instance, program code 216 stored in a computer readable storage medium in a server data processing system may be downloaded over a network from the server to data processing system 200. Data processing system 200 providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code 216. As one example, data processing system 200 may include inorganic components integrated with organic components and/or may be comprised entirely of organic components excluding a human being. For example, a storage device may be comprised of an organic semiconductor. As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
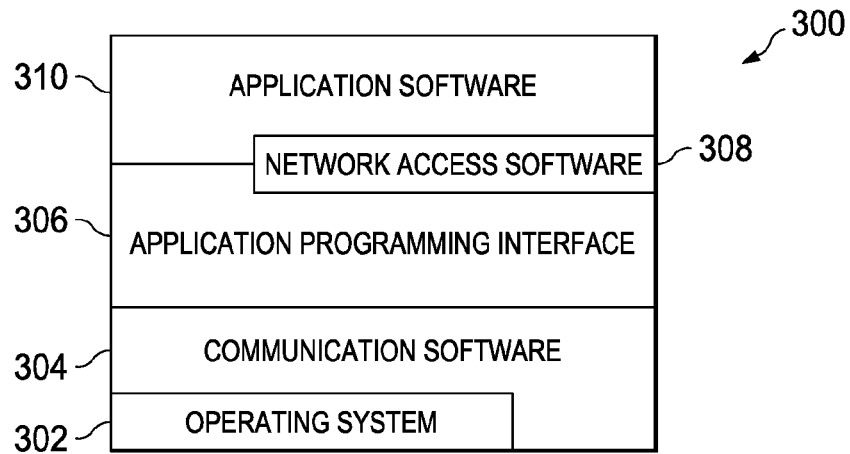
FIG. 3 depicts an exemplary software architecture for a server-client system.

Turning to FIG. 3, typical software architecture for a server-client system 300 is depicted in accordance with an illustrative embodiment. At the lowest level, operating system 302 is utilized to provide high-level functionality to the user and to other software. Such an operating system typically includes a basic input output system (BIOS). Communication software 304 provides communications through an external port to a network, such as the Internet, via a physical communications link by either directly invoking operating system functionality or indirectly bypassing the operating system to access the hardware for communications over the network.

Application programming interface (API) 306 allows the user of the system, such as an individual or a software routine, to invoke system capabilities using a standard consistent interface without concern for how the particular functionality is implemented. Network access software 308 represents any software available for allowing the system to access a network. This access may be to a network, such as a local area network (LAN), wide area network (WAN), or the Internet. With the Internet, this software may include programs, such as Web browsers. Application software 310 represents any number of software applications designed to react to data through the communications port to provide the desired functionality the user seeks. Applications at this level may include those necessary to handle data, video, graphics, photos or text, which can be accessed by users of the Internet. The mechanism of View Element Adjuster 470 (See FIG. 4) may be implemented within communications software 304 in these examples.

Figure 4:
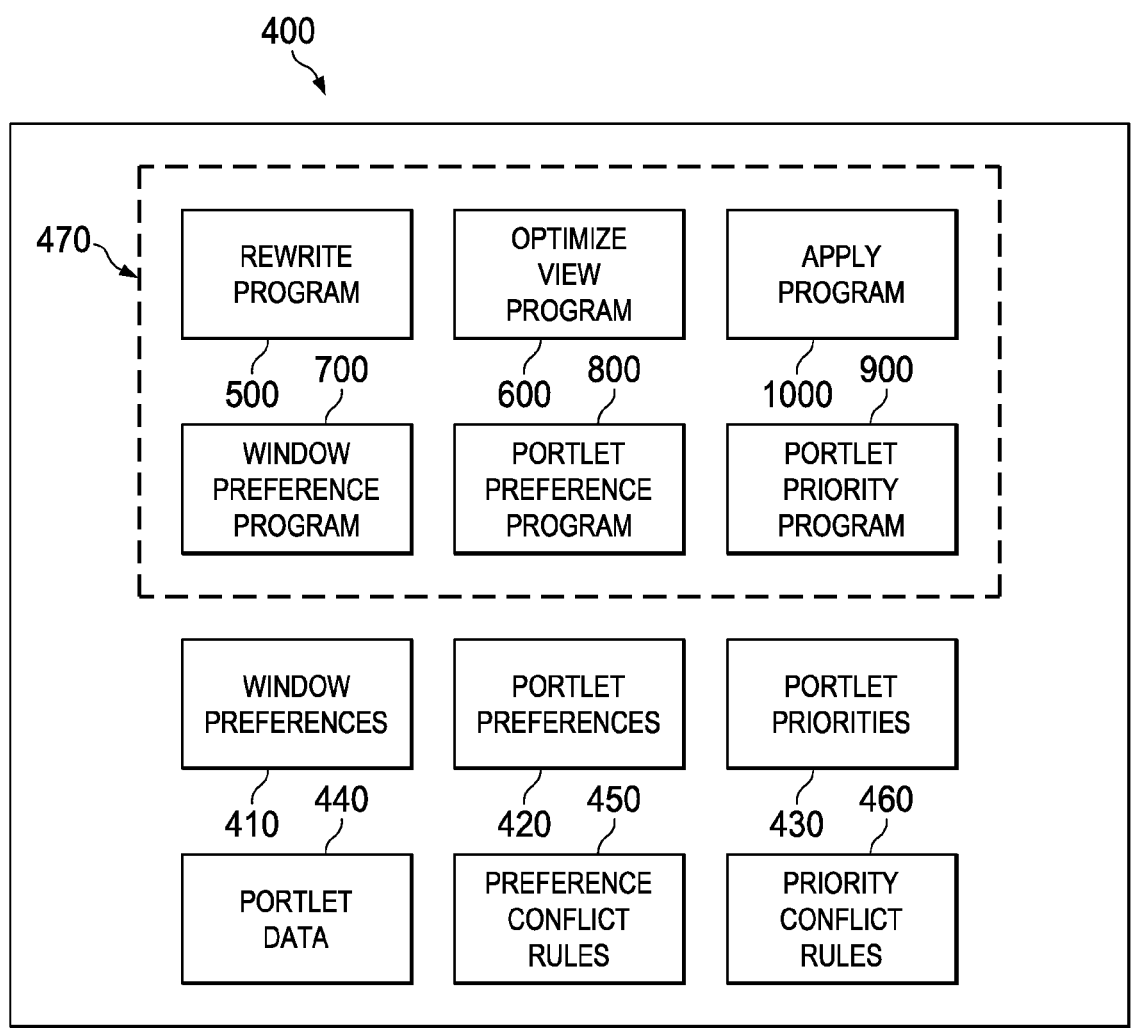
FIG. 4 depicts a memory containing elements of the View Element Adjuster and files accessed by the VEA.

FIG. 4 depicts an exemplary memory or storage containing elements of the View Element Adjuster (VEA) 470 and files accessed by the VEA. Specifically, memory 400 contains VEA 470 comprising rewrite program 500, optimize view program 600, window preference program 700, portlet preference program 800, portlet priority program 900, and apply program 1000. VEA 470 further comprises files accessed by the foregoing programs that include window preferences 410, portlet preferences 420, portlet priorities 430, portlet data 440, preference conflict rules 450, and priority conflict rules 460.

Figure 5:
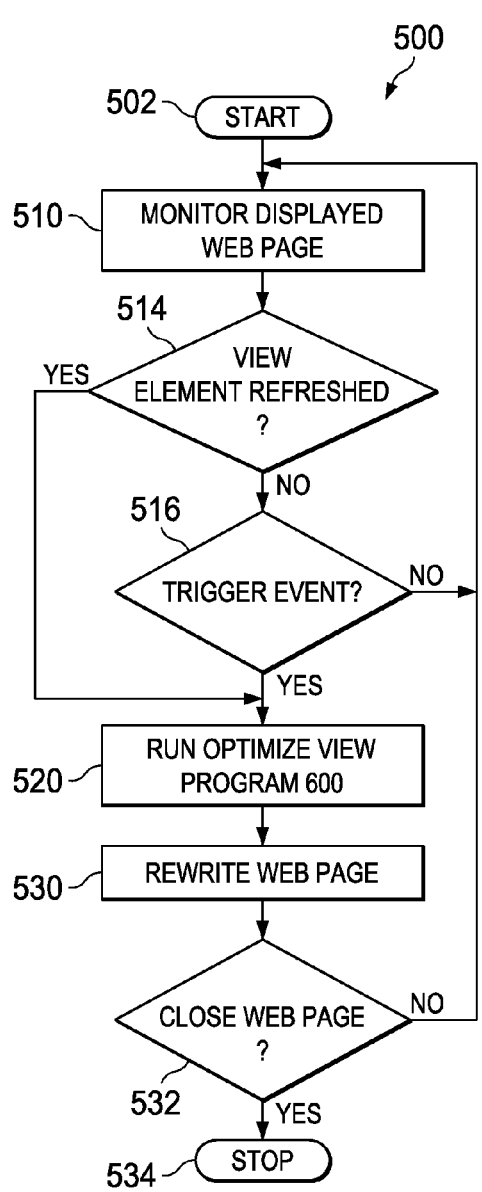
FIG. 5 depicts a flowchart of the logic of the rewrite program.

FIG. 5 depicts a flow chart of the logic of rewrite program 500. Rewrite program 500 starts (502) and monitors a displayed web page (510). Rewrite program 500 determines whether data in a view element has been refreshed (514) or whether a trigger event has occurred (516). As used herein, "trigger event" means an event whose occurrence initiates an action. When none of the foregoing takes place, then rewrite program returns to monitoring the displayed web page (510). When one or more of the foregoing take place, rewrite program invokes the optimize view program 600 (520). Upon completion of the optimize view program, rewrite program rewrites the web page (530). When the web page closes (532), rewrite program 500 stops (534). When it remains open, rewrite program continues to monitor the web page (510).

Figure 6:
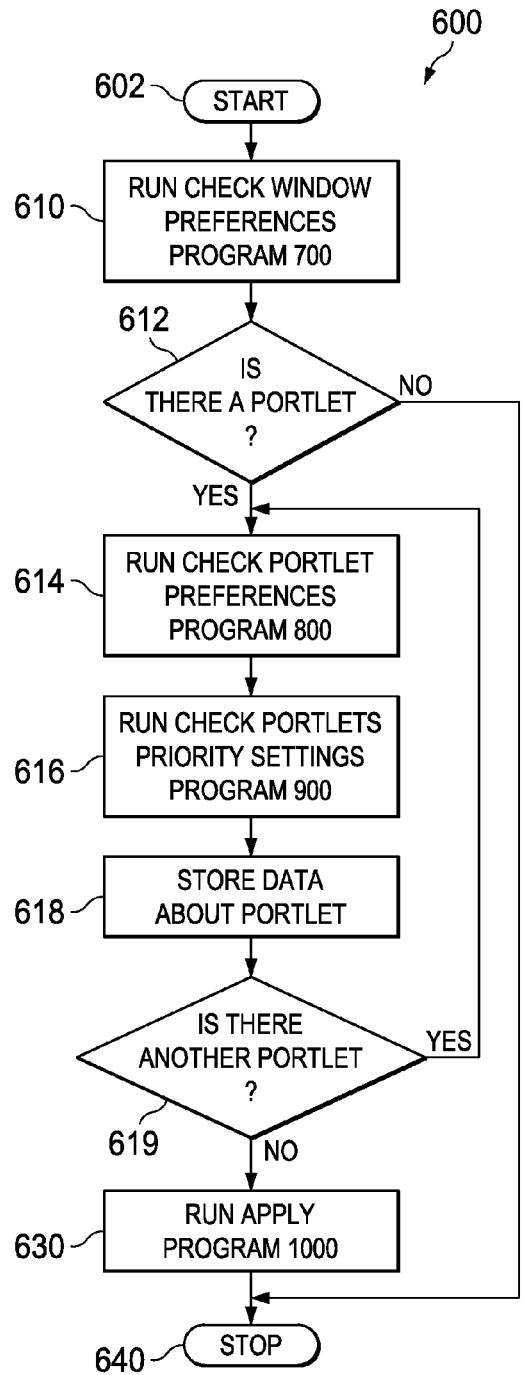
FIG. 6 depicts a flowchart of the logic of the optimize view program.

FIG. 6 depicts a flow chart of the logic of view optimization program 600. View optimization program 600 starts (602) and invokes window preference program 700 and checks window preferences (610). Next, view optimization program 600 determines whether there is a portlet (612) and if so, invokes portlet preference program 800 and checks portlet preferences (614), invokes portlet priority program 900 and checks portlet priority settings (616) and stores data about the portlet (618). View optimization program 600 does this for each portlet until there are no more portlets at step 619. When there are no more portlets at step 619, view optimization program invokes apply program 1000 (630) (See FIGS. 10A and 10B) and stops (640). Apply program will be discussed further below.

Figure 7:
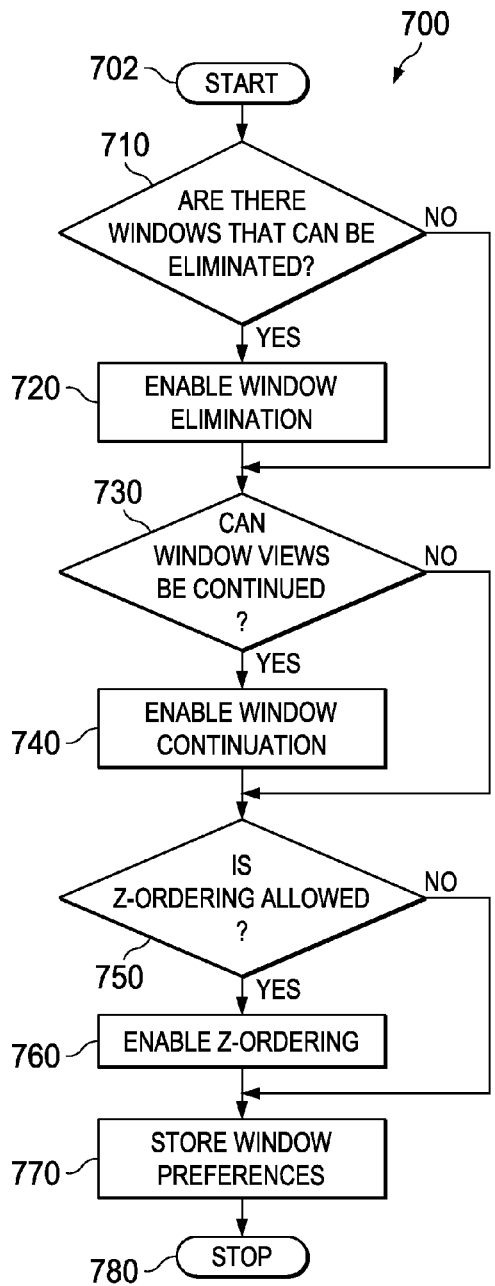
FIG. 7 depicts a flowchart of the logic of the window preference program.

FIG. 7 depicts a flow chart of the logic of window preference program 700. Window preference program 700 starts (702) and determines whether there are windows that can be eliminated (710) and if there are, enables window elimination (720). Next, window preference program 700 determines whether windows can be continued (730) and if so, enables window continuation (740). Finally, window preference program 700 determines whether z-ordering is allowed (750) and if so, enables z-ordering (760). Window preference program 700 stores window preferences (770) and stops (780). As used herein, "z-ordering" means establishing the order in which objects are drawn on top of one another onscreen to simulate depth in conjunction with height and width.

Figure 8:
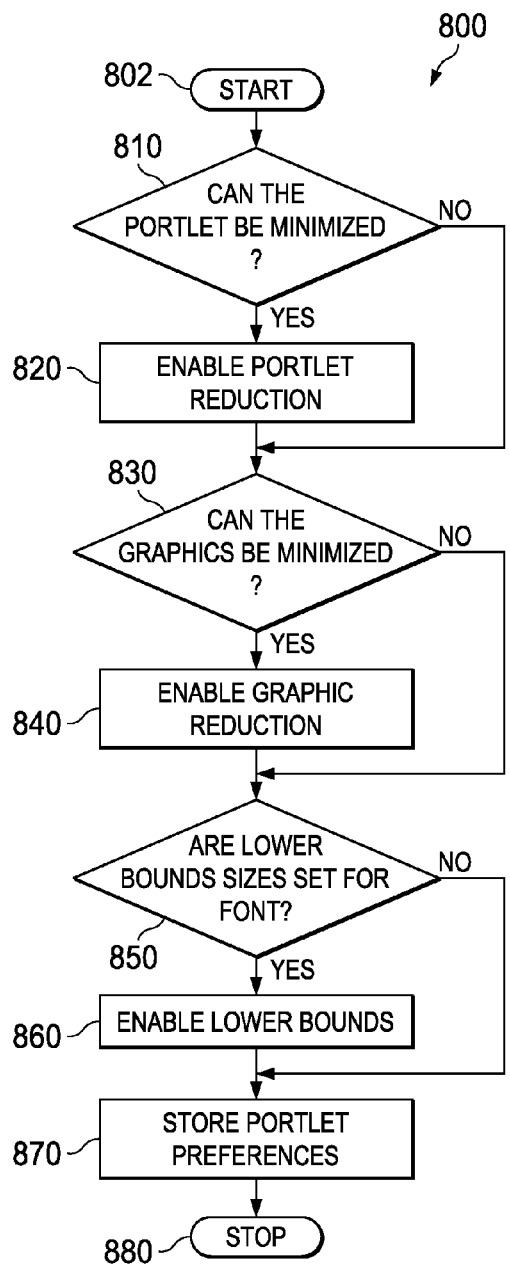
FIG. 8 depicts a flowchart of the logic of the portlet preference program.

FIG. 8 depicts a flow chart of the logic of portlet preference program 800. Portlet preference program 800 starts (802) and determines whether the portlet can be minimized (810). If so, portlet preference program enables portlet reduction (820). Next, portlet preference program 800 determines whether graphics can be minimized (830) and if so, enables graphic reduction (840). Portlet preference program 800 determines whether lower bounds are set for font size 850, and if so, enables lower bounds (860). Portlet preference program 800 stores portlet preferences (870) and stops (880).

Figure 9:
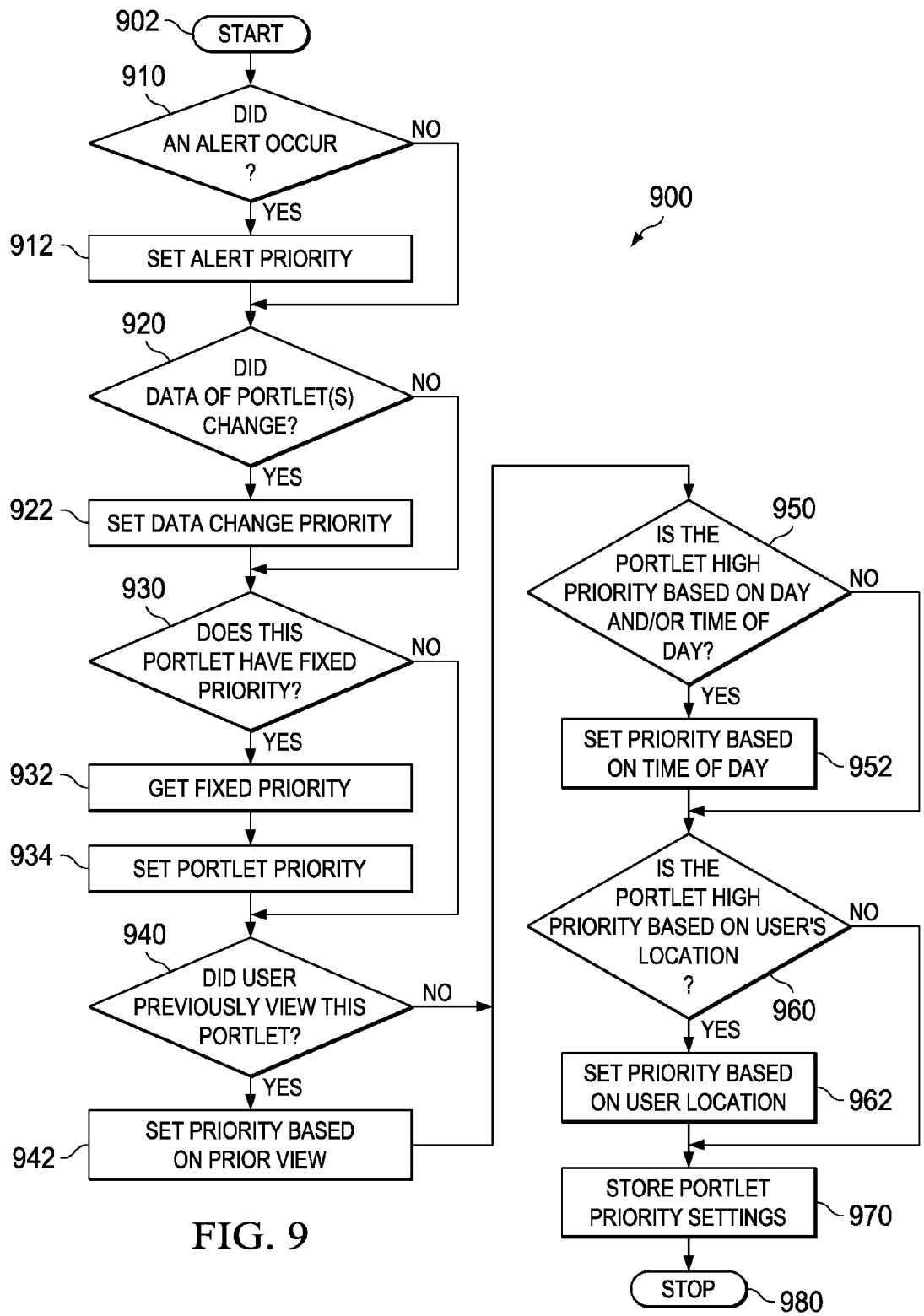
FIG. 9 depicts a flowchart of the logic of the portlet priority program.

FIG. 9 depicts a flow chart of the logic of portlet priority program 900. Portlet priority program 900 starts (902) and determines whether an alert occurred (910). If an alert occurred (910), portlet priority program 900 sets an alert priority (912). Likewise, portlet priority program 900 determines whether a data of the portlet changed (920) and whether the portlet has a fixed priority (930). If so, portlet priority program 900 sets a data change priority (922) and retrieves a fixed priority (932) and sets a portlet priority (934). Next, portlet priority program 900 determines whether the user previously used the portlet (940), whether the portlet priority is based on the date and time of day (950), and whether the portlet priority is based on a user location (960). When a determination is positive, portlet priority program 900 sets priority based on prior viewing (942), sets priority based on time of day (952) and sets priority based on user location (962). The portlet priority settings are stored (970) and the portlet priority program stops (980).

Figure 10A:
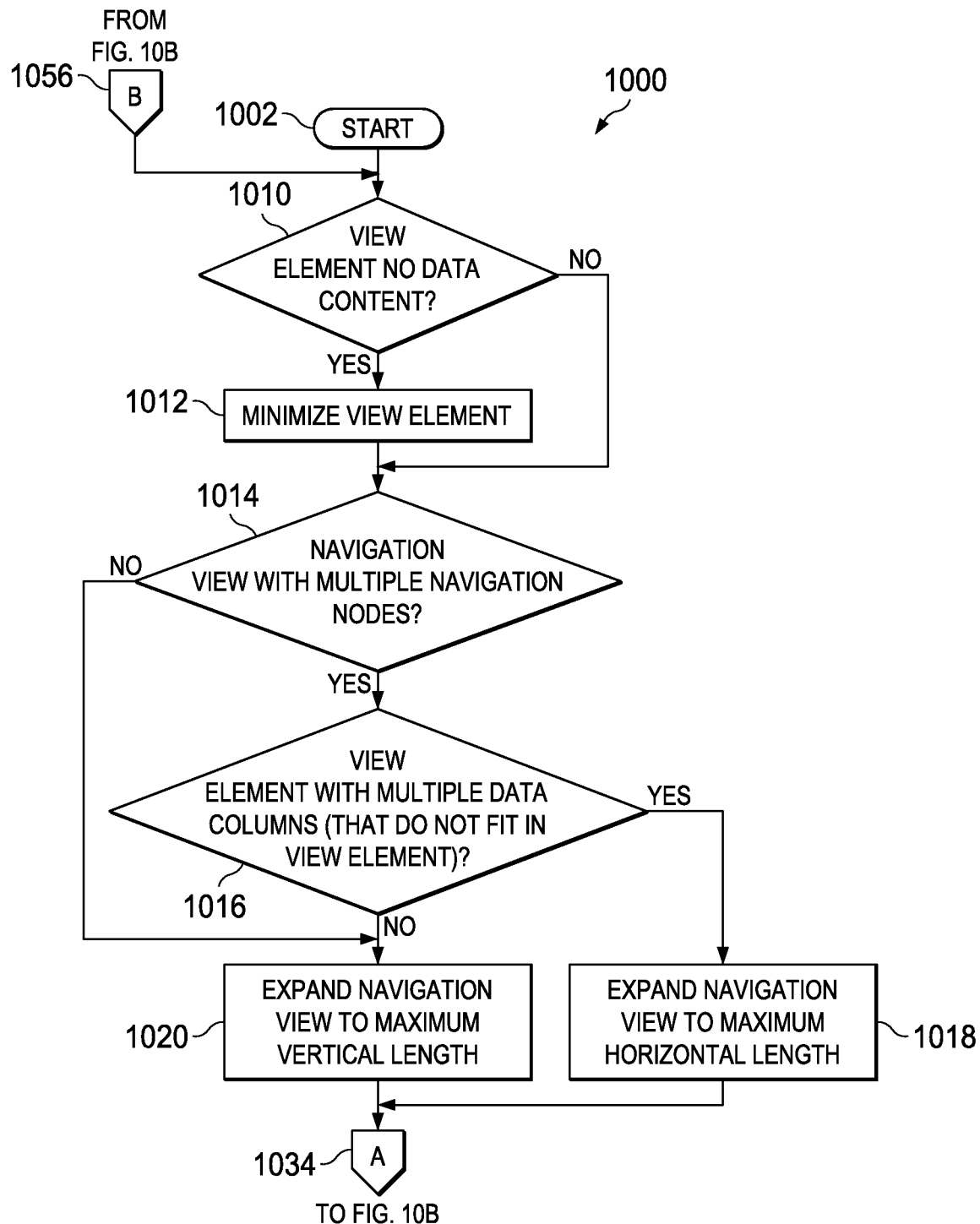
FIG. 10A depicts a flowchart of the apply program.
Figure 10B:
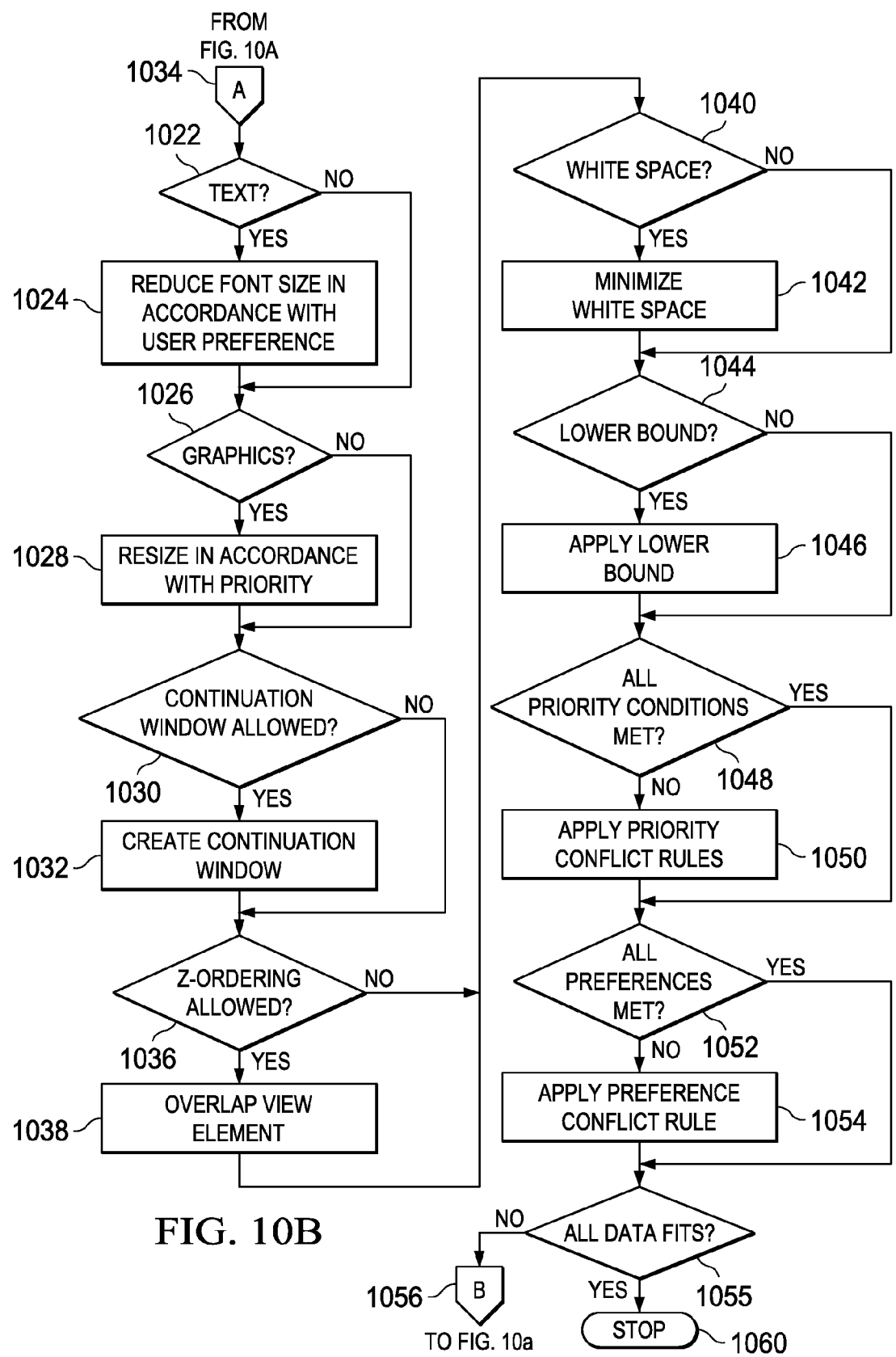
FIG. 10B depicts a continuation of the flowchart of the apply program.

FIGS. 10A and 10B depict a flow chart of the logic of apply program 1000. Apply program 1000 starts (1002) and determines whether a view element has no data content (1010). If a view element has no data content, then apply program 1000 minimizes the view element (1012). Next, apply program 1000 determines whether a navigation view is displayed with multiple navigation nodes (1014). If so, a determination is made whether the view element has multiple data columns (1016). If the view element has multiple data columns that do not fit within the view element (1016), then apply program 1000 expands the navigation view to a maximum horizontal length (1018). If the view element does not have multiple navigation nodes (1014), or multiple data columns (1016), then the navigation view is expanded to a maximum vertical length (1020). Continuing to FIG. 10B (1034), Apply apply program 1000 determines whether there is text in the view element (1022) and if so, reduces the font size in accordance with a user preference (1024). A determination is made whether a graphic is in the view element (1026), and if so, apply program 1000 resizes the graphic in accordance with a priority (1028). Next, apply program 1000 determines whether continuation windows are allowed (1030), and if so, creates a continuation window (1032).

Next, apply program 1000 determines whether z-ordering is allowed (1036), and if so, overlaps view elements in accordance with a z-ordering priority (1038). If white space in the view element may be reduced (1040), the white space if minimized (1042). If lower bounds are designated (1044), lower bounds are applied (1046). Apply program 1000 determines whether all priority conditions have been met (1048) and if not, applies priority conflict rules 460 (1050). A determination is made whether all preferences have been satisfied (1052), and if not, preference conflict rules 450 are applied (1054). Apply program 1000 determines whether all data fits in the web page (1055) and if not returns to step 1010. Connector B 1056 links FIGS. 10A and 10B. If it is determined that all data fits in the web page, apply program stops (1060).

In one embodiment, VEA 470 adjusts a view element size based on the preferences, priorities, and other user requirements, but does not expand the view element to its full horizontal or vertical size unless there is no other way to display the data within the view element and if the view element size is still not large enough for the data in the view element, then the view element will be wrapped. Furthermore, in another embodiment, data that is too long horizontally or vertically is continued in a continuation window.

Figure 11:
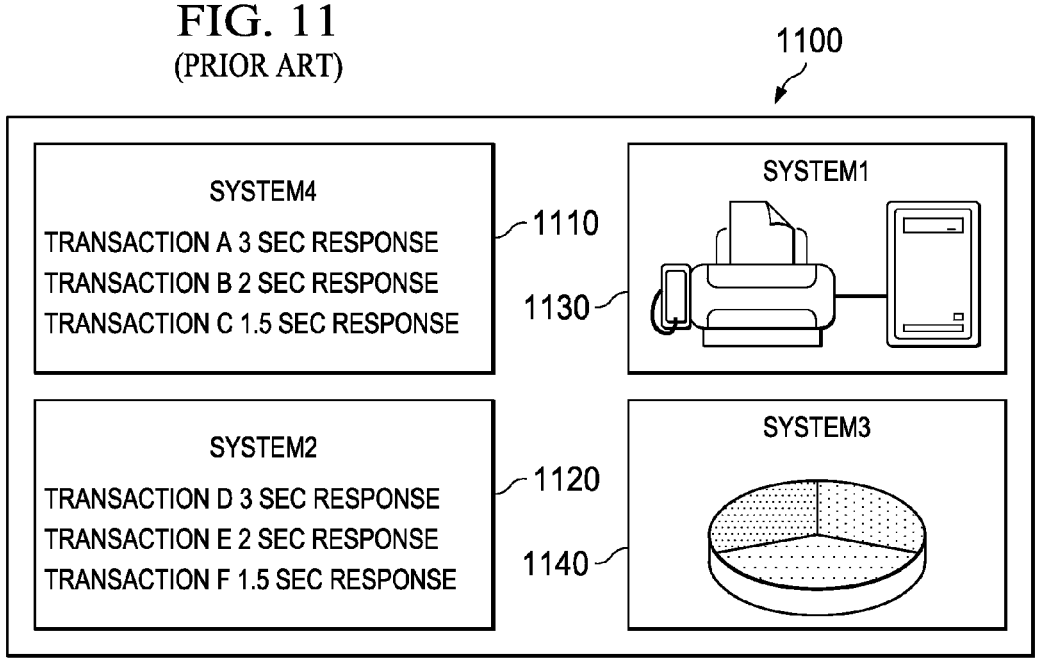
FIG. 11 depicts an exemplary prior art web page with multiple view elements.

FIG. 11 depicts an exemplary prior art web page 1100 with multiple view elements comprising view element "System4" 1110, view element "System2" 1120, view element "system1" 1130 and view element "System3" 1140. In this example, a user views the four windows each containing performance data for a different production system. When there is a sudden network failure on one of the systems, the list of applications and transactions exceeding their time limit becomes very long for System4 and no longer fits in the configured System4 view window 1100. The user clicks the 'optimize view' button (not show) which triggers VEA 470.

VEA 470 must first check whether view optimization preferences, if any, are given. These include view priorities (i.e. which views should take precedence if all cannot be displayed), as well as lower bound sizes, in the event that font reduction or graphics resizing is required. Preferences can be set to inhibit the removal of graphic elements, and to allow overlapped view windows (z-ordering) or eliminate view windows. The user can also allow or disallow the continuation of views in a second window, if space permits.

In this specific example all four system views originally have the same priority. However, in this case, System4 has experienced an alert condition, which according to the preferences of the user, makes System4 view 1100 the highest priority. VEA 470 can set the priority by employing a number of algorithms to determine which view(s) are important. These can include the existence of an alert, as in this case, the user's reference history (the user selects this view most often), the data intensity during peak periods, the time of day, day of the week, location of the user, etc. For example, the user may have different view priorities during workdays as opposed to holidays. Also, the user may select different views when at the office or at home.

Since all views have the same priority in this example, none can be eliminated. However, the user can allow z-ordering causing some views to be shown overlapping other. In this case, it is possible to reduce the size of the windows for System1, System2, and System3 since their data displays are either not fully populated or have graphics and fonts whose sizes exceed the lower bounds. System1 and System3 have some gif and jpeg graphics which can be reduced in size. For System2, the view window can be made shorter in height and narrower in width by reducing the font size. Size reduction is normally less desirable than best fit or removal of white space.

Figure 12:
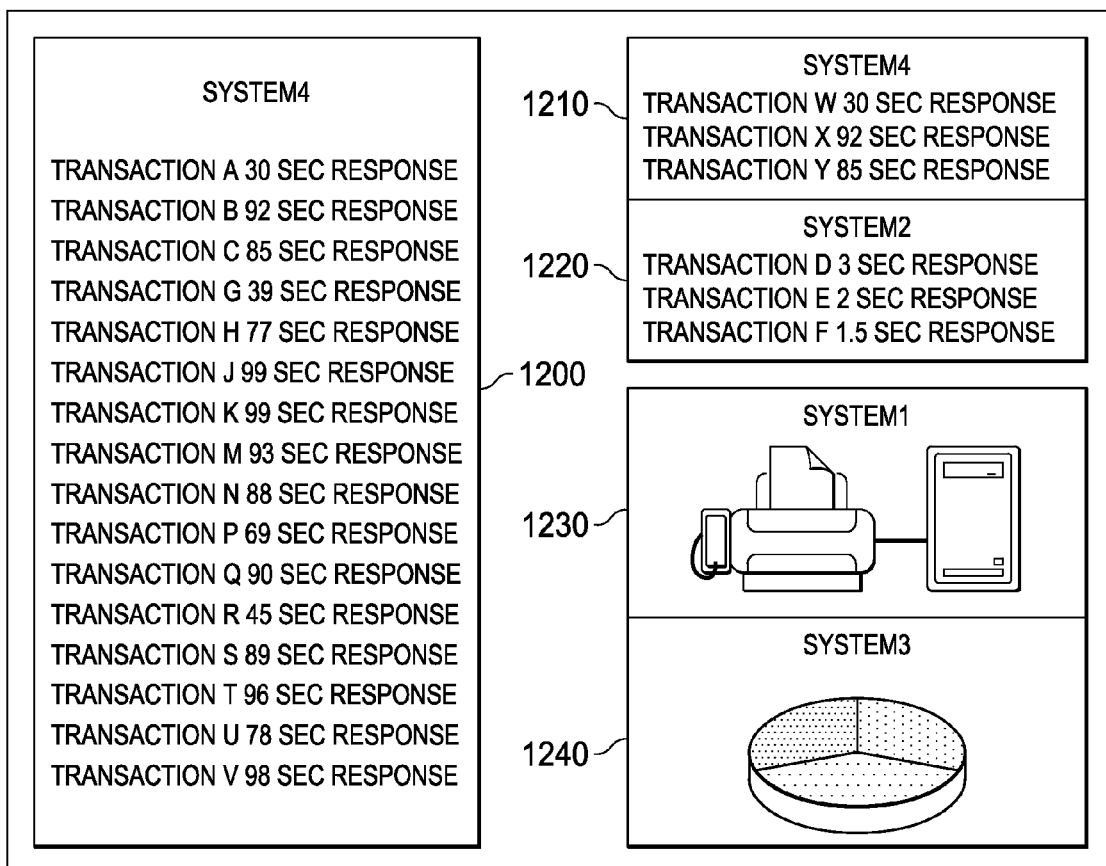
FIG. 12 depicts the exemplary web page after processing by the View Element Adjuster.

FIG. 12 depicts the modified view elements. In this example, System1 window 1230, System2 window 1220 and System3 window 1240 can be reduced such that they occupy most of the right side of the view, allowing System4 window 1210 the entire left side of view 1200. Since there is still some space remaining on the right, System4 view 1200 can be continued in continuation window 1210.

The flowchart and block diagrams in the Figures illustrate the architecture, functionality, and operation of possible implementations of systems, methods and computer program products according to various embodiments of the Delta Framework Software. In this regard, each block in the flowchart or block diagrams may represent a module, segment, or portion of code, which comprises one or more executable instructions for implementing the specified logical function(s). It should also be noted that in some alternative implementations the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of VEA 470 has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A computer implemented method to automatically resize view elements in a graphical user interface, comprising:
    monitoring the graphical user interface;
    responsive to a triggering event, invoking a view optimization program;
    responsive to an invocation of the view optimization program, invoking a window preference program for checking window preferences, a portlet preference program for checking portlet preferences for each portlet, and a portlet priority program for checking portlet priority settings; and
    invoking an apply program for resizing view elements in the graphical user interface based on the window preferences, the portlet preferences, and the portlet priority settings.

2. The computer implemented method of claim 1 wherein the size of each portlet is based on a user preference.

3. The computer implemented method of claim 1 wherein the size of each portlet is based on a user's past viewing pattern of each of the plurality of portlets and the past viewing pattern is based upon a day of the week, a time of day, and a source of the data being displayed by a portal.

4. The computer implemented method of claim 1 wherein the window preferences includes whether continuation windows are allowed.

5. The computer implemented method of claim 1 further comprising:
    when the type of the data is a picture and the user mouses over the picture in a portlet, displaying the picture in an original size in a pop-up display.

6. The computer implemented method of claim 1 wherein the step of resizing comprises:
    responsive to determining that an empty portlet does not contain data, minimizing the empty portlet so that the empty portlet is not displayed.

7. The computer implemented method of claim 1 wherein resizing each portlet comprises:
    maximizing a vertical length of a navigation portlet of the plurality of portlets based on a number of navigation nodes within a navigation view displayed by the navigation portlet.

8. The computer implemented method of claim 1 wherein resizing comprises:
    maximizing a horizontal length of a columned portlet of the plurality of portlets based on a number of columns within the data.

9. The computer implemented method of claim 1 wherein resizing comprises:
    resizing a graphic portlet to fit within the display of a portal based on the size of other portlets; and
    wherein the type of the data of the graphic portlet is a picture.

10. The computer implemented method of claim 1 wherein a higher priority portlet of the plurality of portlets is resized before a lower priority portlet of the plurality of portlets based upon the priority assigned by a user to the higher priority portlet and based upon the priority assigned by the user to the lower priority portlet.

11. A programmable apparatus for automatically resizing view elements in a graphical user interface, comprising:
    a computer having a memory;
    a view element adjuster in the memory, the computer being directed by the view element adjuster to perform the following steps:
    monitoring the graphical user interface;
    responsive to a triggering event, invoking a view optimization program;
    responsive to an invocation of the view optimization program, invoking a window preference program for checking window preferences, a portlet preference program for checking portlet preferences for each portlet, and a portlet priority program for checking portlet priority settings; and
    invoking an apply program for resizing view elements in the graphical user interface based on the window preferences, the portlet preferences, and the portlet priority settings.

12. A non-transitory computer readable storage medium for causing a computer to automatically resize a portlet of a plurality of portlets in a single web page, comprising:
    a computer readable storage medium;
    a view element adjuster program stored in the storage medium;
    the storage medium, so configured by the view adjuster program, causes a computer to perform steps comprising:
    monitoring the graphical user interface;
    responsive to a triggering event, invoking a view optimization program;
    responsive to an invocation of the view optimization program, invoking a window preference program for checking window preferences, a portlet preference program for checking portlet preferences for each portlet, and a portlet priority program for checking portlet priority settings; and
    invoking an apply program for resizing view elements in the graphical user interface based on the window preferences, the portlet preferences, and the portlet priority settings.

* * * * *